(12) United States Patent
Sangameswaran et al.

(10) Patent No.: US 10,988,091 B2
(45) Date of Patent: Apr. 27, 2021

(54) ERASE-REPLACE OTA SMART POWER STRATEGY

(71) Applicant: FORD GLOBAL TECHNOLOGIES, LLC, Dearborn, MI (US)

(72) Inventors: Sangeetha Sangameswaran, Canton, MI (US); Jason Michael Miller, Woodhaven, MI (US); William C. Dierker, Canton, MI (US); Douglas B. Thornburg, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 568 days.

(21) Appl. No.: 15/864,736

(22) Filed: Jan. 8, 2018

(65) Prior Publication Data

US 2019/0210545 A1    Jul. 11, 2019

(51) Int. Cl.
| | |
|---|---|
| *B60R 16/023* | (2006.01) |
| *B60R 16/03* | (2006.01) |
| *B60W 50/00* | (2006.01) |
| *G06F 8/65* | (2018.01) |
| *H01H 47/00* | (2006.01) |
| *B60R 16/033* | (2006.01) |

(52) U.S. Cl.
CPC .......... *B60R 16/0238* (2013.01); *B60R 16/03* (2013.01); *B60R 16/033* (2013.01); *B60W 50/00* (2013.01); *G06F 8/65* (2013.01); *H01H 47/00* (2013.01); *B60W 2050/0079* (2013.01); *B60W 2050/0083* (2013.01); *H01H 47/001* (2013.01)

(58) Field of Classification Search
CPC ... B60R 16/0238; B60R 16/03; B60R 16/033; B60W 50/00; B60W 2050/0079; B60W 2050/0083; G06F 8/65; H01H 47/00; H01H 47/001
See application file for complete search history.

(56) References Cited

U.S. PATENT DOCUMENTS

| | | | |
|---|---|---|---|
| 8,634,482 B2* | 1/2014 | Towers | H04W 52/0261 375/259 |
| 9,827,997 B2* | 11/2017 | Lindstrand | B60W 50/00 |
| 10,140,116 B2* | 11/2018 | Caushi | G06F 8/654 |
| 10,387,139 B2* | 8/2019 | Fox | G06F 16/188 |
| 2010/0292808 A1* | 11/2010 | Berglund | G06F 1/3203 700/3 |
| 2016/0231804 A1 | 8/2016 | Bulusu et al. | |
| 2016/0291962 A1 | 10/2016 | Michishita | |
| 2017/0123782 A1 | 5/2017 | Choi | |
| 2017/0124871 A1* | 5/2017 | Sunadham | H04Q 9/00 |
| 2018/0107473 A1* | 4/2018 | Ahmed | H04L 67/34 |
| 2018/0341476 A1* | 11/2018 | Kitao | H04L 67/34 |
| 2020/0125355 A1* | 4/2020 | Aust | H04W 12/08 |

* cited by examiner

*Primary Examiner* — Frederick M Brushaber
(74) *Attorney, Agent, or Firm* — Michael J. Spenner; Brooks Kushman P.C.

(57) ABSTRACT

A power distribution box (PDB) includes relays to connect a vehicle battery to corresponding electronic control units (ECUs) of a vehicle. A processor is programmed to instruct the PDB via a control interface to cause one of the relays to power a target ECU, send a sleep command over a vehicle bus to cause powered ECUs other than the target ECU to sleep, and install a software update to the target ECU.

16 Claims, 3 Drawing Sheets

US 10,988,091 B2

ERASE-REPLACE OTA SMART POWER STRATEGY

TECHNICAL FIELD

Aspects of the disclosure generally relate to an erase-replace over-the-air smart power strategy.

BACKGROUND

Software updates applied to a vehicle electronic control unit (ECU) at the dealership may involve a diagnostic download method. A technician connects a test tool to the vehicle (e.g., via an on-board diagnostic port). Using the test tool, the vehicle is placed into a programming mode. In the programming mode, the current version of software is erased and replaced with a new version. During the update, the technician usually connects the vehicle to a battery charger to ensure sufficient power to the ECUs during the update process.

SUMMARY

In one or more illustrative examples, a system includes a power distribution box (PDB) including relays to connect a vehicle battery to corresponding electronic control units (ECUs) of a vehicle; and a processor programmed to instruct the PDB via a control interface to cause one of the relays to power a target ECU, send a sleep command over a vehicle bus to cause powered ECUs other than the target ECU to sleep, and install a software update to the target ECU.

In one or more illustrative examples, a method includes instructing a relay to power a target electronic control unit (ECU) at vehicle keyoff; sending a sleep command over a vehicle bus to cause powered ECUs other than the target ECU to sleep; installing a software update to the target ECU; sending an exit sleep command over the vehicle bus to cause the powered ECUs to exit sleep, and instructing the relays to remove power from the target ECU.

In one or more illustrative examples, a non-transitory computer readable medium including instructions that, when executed by a processor of a body control electronic control unit (ECU), cause the body control ECU to instruct a relay of a power distribution box (PDB) to power a target electronic control unit (ECU) at vehicle keyoff; send a sleep command over a vehicle bus to cause powered ECUs other than the target ECU to sleep to allow for installation of a software update; and responsive to completion of the installation of the software update, send an exit sleep command over the vehicle bus to cause the powered ECUs to exit sleep and instruct the relay to remove power from the target ECU.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

When a software update is installed by a technician at a dealership, the technician may be able to connect the vehicle to a battery charger. However, if the software update is performed using over-the-air (OTA) updates, a programming session may be initiated without a battery charger being attached and without the engine being on to provide electrical power. Thus, in the case of an OTA update, there may be limited battery power available to complete the software update. Accordingly, the vehicle should ensure that the software update also does not drain the battery to the extent that there is not enough battery power to start the vehicle.

A common and simple solution may be to check the battery state of charge (SOC), and proceed with the update only if the battery SOC at key off is greater than a predefined threshold. If the SOC is less than the threshold, then the vehicle may elect to wait for the next key cycle. However, most keyoff component programs are at their limits for key off power, so having a single threshold for the updates may result in the vehicle being unable to perform a majority of software updates.

An improved electrical architecture for a vehicle may be used to actively turn on or off vehicle features or ECUs that consume power during vehicle keyoff. Relays may be incorporated into the power architecture feeding the vehicle ECUs, such that ECUs that do not require updates can be detached from electric power during the software update. By doing so, the keyoff load of these ECUs may be temporarily removed. The system may be further programmed to provide messages to the ECUs to be disconnected to allow the ECUs to sleep or shut down before power is interrupted. When the update is complete, the ECUs may again be powered. Accordingly, as keyoff load is minimized during software updates, the vehicle may have a greater ability to perform software updates within the limited power budget of the vehicle during keyoff.

Figure 1:
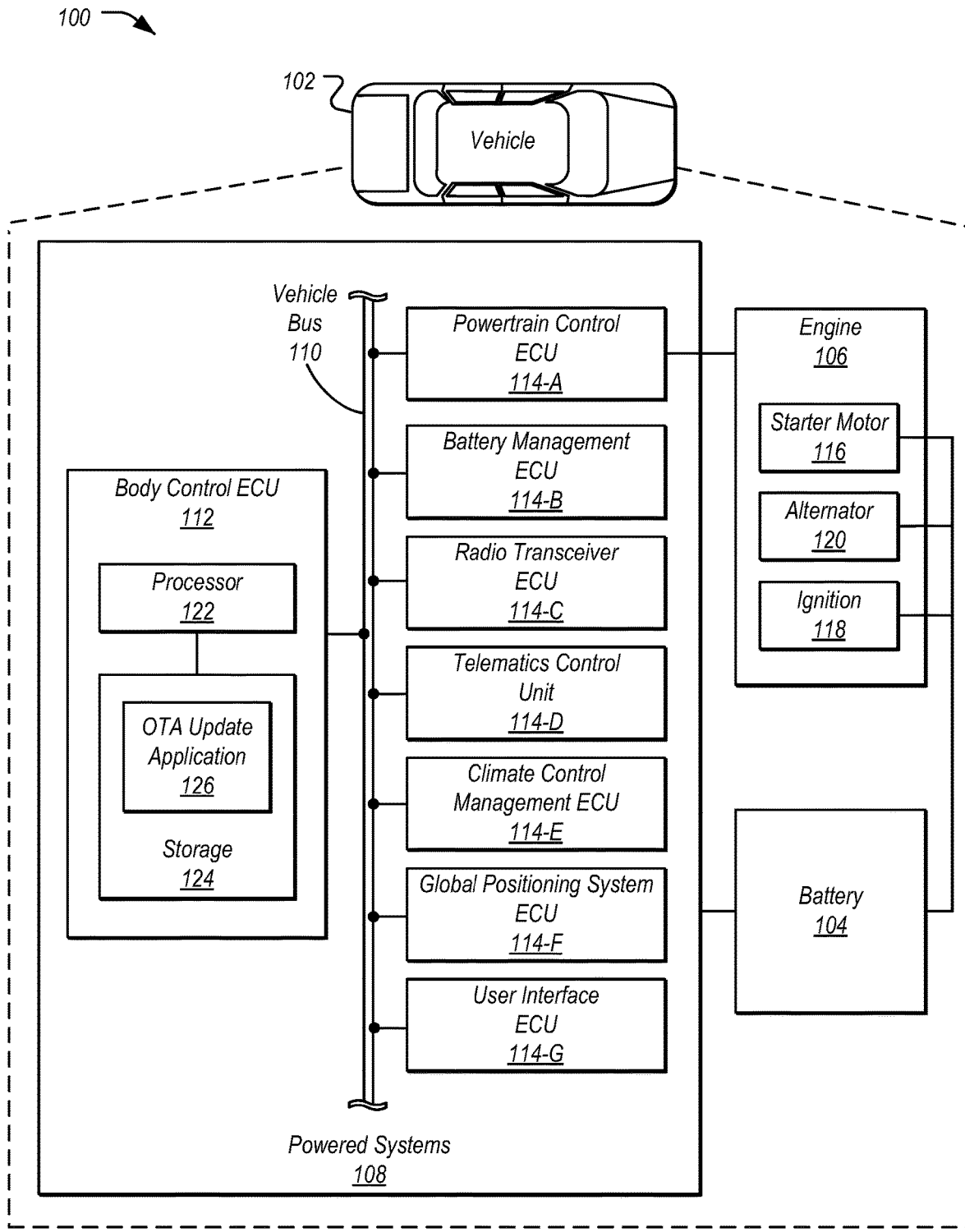
FIG. 1 illustrates an example system including a vehicle for implementing a smart power strategy for vehicle software updates.

FIG. 1 illustrates an example system 100 including a vehicle 102 for implementing a smart power strategy for vehicle software updates. As illustrated, the vehicle 102 includes a battery 104, an engine 106, powered systems 108, and one or more vehicle buses 110. The powered systems 108 include a body control ECU 112 and plurality of system ECUs 114. The ECUs 112, 114 are in communication over the bus 110 and configured to perform various vehicle functions under the power of the vehicle battery 104.

The battery 104 may include various types of rechargeable battery configured to supply electric energy to various components of the vehicle 102. In an example, the battery 104 may be a 12-Volt lead-acid battery. The battery 104 may be configured to power the starter motor 116 and the ignition system 118 of the engine 106 when the engine 106 is not running, and may receive electric charge from the alternator 120 when the engine 106 is running. In another example, the battery 104 may include a traction battery or battery pack configured to store energy that can be used by one or more electric machines of the vehicle 102 that can provide propulsion and deceleration capability, whether the engine 106 is turned on or off.

The body control ECU 112 may be configured to support various functions of the vehicle 102 related to control of current loads feeding off the battery 104. Examples of such current loads include, but are not limited to, exterior lighting, interior lighting, heated seats, heated windshield, heated backlight, and heated mirrors. Additionally, the body control ECU 112 may be configured to manage vehicle 102 access functions, such as keyless entry, remote start, and point of access status verification (e.g., closure status of the hood, doors and/or trunk of the vehicle 102).

The vehicle bus 110 may include various methods of communication available between the system ECUs 114, as well as between the body control ECU 112 and the system ECUs 114. As some non-limiting examples, the vehicle bus 110 may include a controller area network (CAN) bus and/or an Ethernet network.

The body control ECU 112 may include various types of computing apparatus to facilitate the performance of the functions of the body control ECU 112. In an example, the body control ECU 112 may include a processor 122 configured to execute computer instructions, and a storage medium 124 on which the computer-executable instructions may be maintained. A computer-readable storage medium 124 (also referred to as a processor-readable medium 124 or storage 124) includes any non-transitory (e.g., tangible) medium that participates in providing data (e.g., instructions) that may be read by a computer (e.g., by the processor 122). In general, a processor 122 receives instructions, e.g., from the storage 124, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Java Script, Perl, PL/SQL, etc.

The plurality of system ECUs 114 may be configured to perform various vehicle functions under the power of the vehicle battery 104. As depicted, the ECUs 114 are represented as discrete ECUs 114. However, the ECUs 114 may share physical hardware, firmware, and/or software, such that the functionality from multiple ECUs 114 may be integrated into a single ECU 114, and that the functionality of various such ECUs 114 may be distributed across a plurality of ECUs 114.

As some non-limiting ECU 114 examples, a powertrain control ECU 114-A may be configured to provide control of engine 106 operating components (e.g., idle control components, fuel delivery components, emissions control components, etc.) and for monitoring status of such engine operating components (e.g., status of engine fault codes); a battery management ECU 114-B may be configured to compute and provide state of charge status (e.g., to the powertrain control ECU 114-A or others); a radio transceiver ECU 114-C may be configured to send and receive messages by way of a wireless communications network 126 or paired communications device; a telematics control unit 114-D may be configured to send and receive commands from the paired communications device or wireless communications network 126 connection using the facilities of the radio transceiver ECU 114-C (e.g., to provide low battery alerts to a driver's phone or to a web database); a climate control management ECU 114-E may be configured to provide control of heating and cooling system components (e.g., compressor clutch, blower fan, temperature sensors, etc.); a global positioning system (GPS) ECU 114-F may be configured to provide vehicle location information; and a user interface ECU 114-G may be configured to provide vehicle status information to a driver, such as fuel level information, engine operating temperature information, and current location of the vehicle 102.

The system ECUs 114 may be configured to perform certain vehicle functions when the engine 106 is running. In other cases, the system ECUs 114 may be configured to perform at least a subset of their functions even when the vehicle is parked and the vehicle engine 106 is not running (sometimes referred to herein as keyed off). As some non-limiting examples of ECU 112, 114 functionality that may be performed when the vehicle is keyed off, the body control ECU 112 may perform periodic polling for keyless entry, passive entry, or other access management features, the battery management ECU 114-B may perform battery drive conditioning and provide warnings regarding scheduled charges that are not occurring, the radio transceiver ECU 114-C may receive commands such as unlock or remote start, the climate control management ECU 114-E may perform cabin preconditioning in anticipation of an expected trip by the driver at a time prescheduled with the vehicle 102, and the GPS ECU 114-F may provide location updates for the vehicle 102.

As noted above, the telematics control unit 114-D may include network hardware configured to facilitate communication between the vehicle ECUs 112 and other devices of the system 100. For example, the telematics control unit 114-D may include or utilize an in-vehicle cellular modem to facilitate communication over the communications network 126. The communications network 126 may include one or more interconnected communication networks such as the Internet, a cable television distribution network, a satellite link network, a local area network, a wide area network, and a telephone network, as some non-limiting examples. As another example, the telematics control unit 114-D may utilize one or more of Bluetooth, Wi-Fi, or wired USB network connectivity to facilitate communication with the communications network 126 via the user's mobile device.

An update server 128 may include one or more devices configured to serve software updates 130 to the vehicle 102. The update server 128 may be configured to store software updates 130 that may be provided to the vehicle 102. The software updates 130 may include changes to the software or settings of the vehicle 102 to address an issue with the current software or settings, or to provide improved functionality to the current software. The software updates 130 may include, for example, updated configuration settings for one or more vehicle ECUs 114, and/or updated versions of software or firmware to be installed on one or more vehicle ECUs 114. In some cases, software updates 130 may include a single section, while in other cases software updates 130 may be organized into multiple subsections, partitions, or chunks, where all the subsections may be downloaded to complete the overall software update 130 to be installed.

The update server 128 may be further configured to store additional information about the software updates 130. For example, the update server 128 may be configured to maintain an optional/required flag regarding the software updates 130 allowing the vehicle 102 to determine which software updates 130 are necessary and which are optional (e.g., an optional flag). As another example, the update server 128 may be configured to maintain indications of which vehicle ECUs 114 are associated with which software updates 130. The update server 128 may further store information indicative of the compatibility of the software updates 130 to vehicle model or configuration. For instance, a storage entry for a software update 130 may indicate that the software update 130 is compatible with a certain make and model of vehicle 102, or that it has a dependency on a version of another vehicle ECU 114 being of a particular version or versions.

The update server 128 may be configured to receive update requests for available software updates from vehicles 102. The update requests may include vehicle information to allow the update server 128 to query for software updates 130 applicable to the vehicle 102 as it is currently configured. The update server 128 may provide, responsive to the update requests, indications of software updates 130 (or the software updates 130 themselves) to update the requesting vehicle 102 that may be downloaded and installed. The update server 128 may be further configured to provide the software updates 130 to devices requesting to download the software updates 130 according to the provided indications.

Vehicle functions performed by the body control ECU 112 and system ECUs 114 when the vehicle 102 is keyed off produce a current drain on the battery 104 of the vehicle 102. In some cases, when the vehicle 102 is parked for an extended period of time, the keyoff loads may cause a significant reduction in the state of charge of the battery 104. Moreover, when OTA software updates are schedule to be performed to the vehicle 102, the installation of software updates 130 may require additional battery 104 keyoff load. In the case of an OTA update at keyoff, the battery 104 may have insufficient battery power available to complete the software update To address these keyoff loads during the procedure for applying software updates 130, the vehicle 102 may utilize an OTA update application 132 to implement an OTA update mode in which keyoff load is minimized. The OTA update application 132 may be one application included on the storage 124 of the body control ECU 112. The OTA update application 132 may include instructions that, when executed by the body control ECU 112, cause the body control ECU 112, in response to receiving an indication from a requesting vehicle 102 to transition the vehicle 102 into OTA update mode, to issue commands to the vehicle 102 to transition to a reduced power mode, perform the software update in the reduced power mode, and to issue commands to the vehicle 102 to transition to a normal keyoff power mode. Further aspects of the operation of the OTA update application 132 are discussed in detail below.

Figure 2:
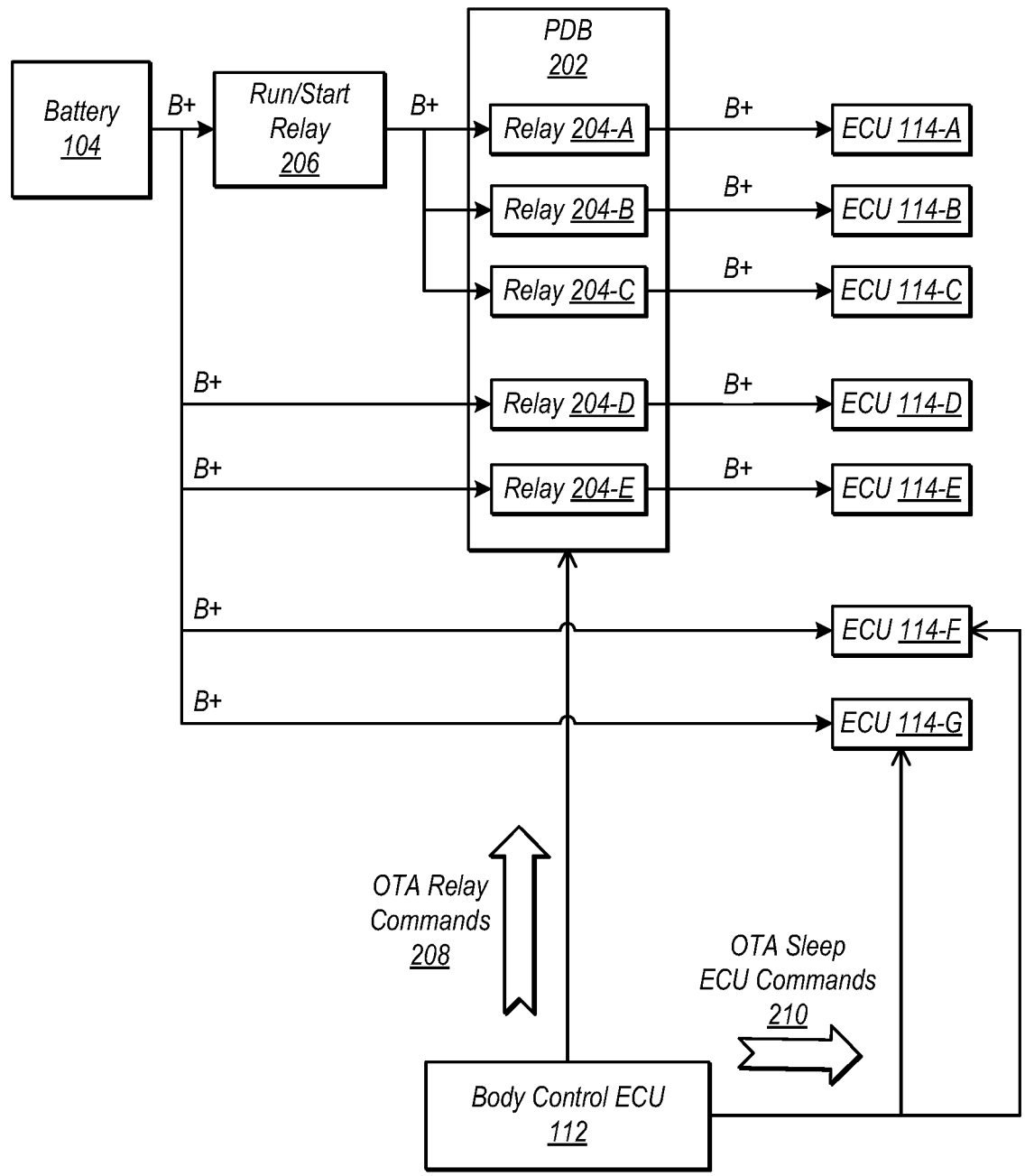
FIG. 2 illustrates an example power architecture incorporating relays into power lines feeding the vehicle ECUs of the vehicle.

FIG. 2 illustrates an example power architecture 200 incorporating relays into power lines feeding the vehicle ECUs of the vehicle. As shown, the power architecture 200 illustrates battery wiring of the positive terminal of the battery 104 to various ECUs 114.

A power distribution box (PDB) 202 may function as a hub in the electrical architecture of the vehicle 102, and may control and provide power to the various ECUs 114 as well as to other electrical features of the vehicle 102. The PDB 202 may include fuses, relays, a microcontroller, and one or more layers of interconnection to provide protection against excessive current loads indicative of a short circuit by shutting down circuit function.

One or more of the ECUs 114 may be connected to the battery 104 via the PDB 202 (e.g., ECUs 114-A, 114-B, 114-C, 114-D, and 114-E in the illustrated example). The PDB 202 may be configured to connect each ECU 114 through a corresponding relay 204 configured to connect or disconnect the positive battery terminal to the ECU 114 to the electrical circuit to the battery 104. As shown, a relay 204-A is configured to connect or disconnect the positive battery 104 terminal to the ECU 114-A, a relay 204-B is configured to connect or disconnect the positive battery 104 terminal to the ECU 114-B, a relay 204-C is configured to connect or disconnect the positive battery 104 terminal to the ECU 114-C, a relay 204-D is configured to connect or disconnect the positive battery 104 terminal to the ECU 114-D, and a relay 204-E is configured to connect or disconnect the positive battery 104 terminal to the ECU 114-E. Other ECUs 114 may be connected to the battery 104 without the PDB 202 as an intermediary (e.g., ECUs 114-D and 114-E as shown). Accordingly, these ECUs 114 may not operate under relay 204 control.

A run/start relay 206 may be configured to control the functioning of electrical components of the vehicle 102 that invoke the start motor 116 and ignition system 118 functionality of the vehicle 102. Certain of the ECUs 114 may be further controlled via a run/start relay 206, to prevent their operation unless the vehicle 102 is experiencing valid conditions for a vehicle 102 start (e.g., detection of a valid key fob paired to the vehicle 102, the engine 106 is not already started, etc.). In the illustrated example, the ECUs 114-A, 114-B, and 114-C are further connected to the battery 104 through the run/start relay 206, in addition to connection through the PDB 202.

The body control ECU 112 may be connected to a control interface of the PDB 202. In an example, the control interface may be a dedicated set of wires from the body control ECU 112 to the PDB 202. In another example, the control interface may be the vehicle bus 110. Using the control interface, the body control ECU 112 may be configured to individually activate or deactivate the relays 204 of the PDB 202. In an example, the OTA update application 132 of the body control ECU 112 may be programmed to cause the body control ECU 112 to send OTA relay commands 208 via the control interface of the PDB 202 to control which ECUs 114 are connected to the battery 104 during keyoff for purposes of OTA software update. For example, the OTA update application 132 may be programmed to cause the body control ECU 112 to send OTA relay commands 208 to disconnect ECUs 114 from the battery 104 that are operable during keyoff but are not required for performance of installation of a software update 130. The OTA update application 132 may also be programmed to cause the body control ECU 112 to send OTA relay commands 208 to reconnect ECUs 114 to the battery 104 that are operable during keyoff after completion of the installation of the software update 130.

Moreover, the OTA update application 132 may be further programmed to cause the body control ECU 112 to send OTA sleep ECU commands 210 over the vehicle bus 110 to the ECUs 114 that are not controlled via relays 204 of the PDB 202. For example, the OTA update application 132 may be programmed to cause the body control ECU 112 to send OTA sleep ECU commands 210 to disable keyoff functions of ECUs 114 that are operable during keyoff but are not required for performance of installation of the software updates 130. The OTA update application 132 may also be programmed to cause the body control ECU 112 to OTA sleep ECU commands 210 to reenable the disabled functions of the ECUs 114 that are operable during keyoff after completion of the installation of the software update 130.

Figure 3:
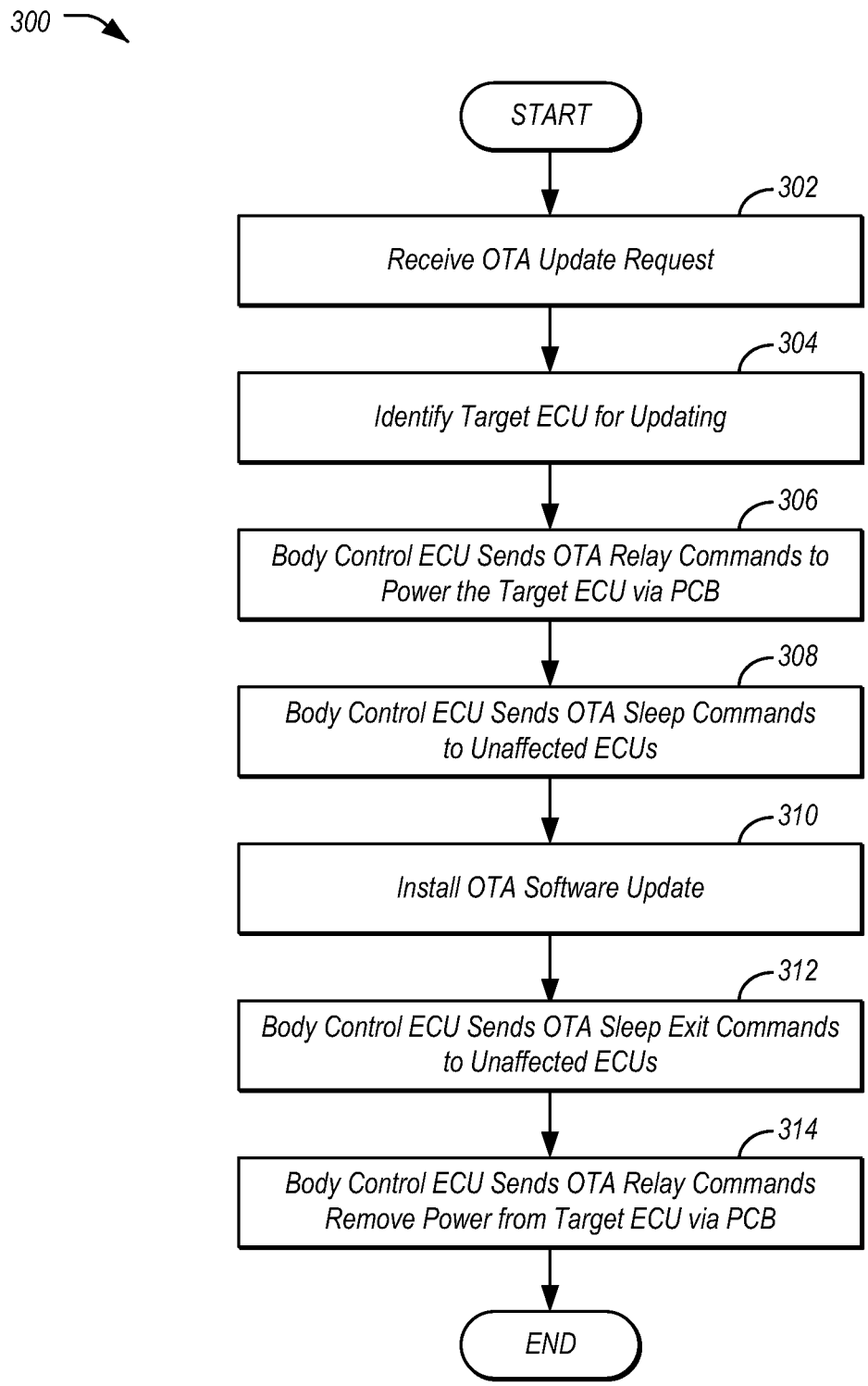
FIG. 3 illustrates an example process for implementing a smart power strategy for performance of installation of vehicle software updates.

FIG. 3 illustrates an example process 300 for implementing a smart power strategy for performance of installation of vehicle software updates 130. In an example, the process 300 may be performed using the system 100 including the power architecture 200 discussed above.

At operation 302, the vehicle 102 receives an OTA update request. In an example, the telematics control unit 114-D may manage the installation of software updates 130. For example, the telematics control unit 114-D may receive a command from a user requesting to check for software updates 130. As another possibility, the telematics control unit 114-D may trigger a periodic check for new software updates 130. When triggered, the telematics control unit 114-D may send an update request to the update server 128 to inquire whether software updates 130 for the vehicle 102 are available. For example, the telematics control unit 114-D may query the update server 128 using the vehicle information (or, if the update server 128 data store maintains current vehicle information, an identifier of the vehicle 102), and may receive a response from the update server 128 indicative of whether new software updates 130 for the vehicle 102 are available (e.g., as links or other identifiers of software updates 130 for the vehicle 102 to download). The determination of whether new updates are available may be based, for example, on the configuration information maintained for the requesting vehicle 102. If the response to the vehicle 102 indicates software updates 130 are available for the vehicle 102, the telematics control unit 114-D may download the indicated software updates 130, or in other cases queue the software updates 130 to be downloaded.

At 304, the vehicle 102 identifies a target ECU 114 for updating. In an example, the software update 130 may include an identifier of an ECU 114 to which the software updates 130 is to be applied. The telematics control unit 114-D may send this identifier of the ECU 114 to the body control ECU 112, to cause the body control ECU 112 to set up power conditions for installation of the software update 130.

The body control ECU 112 sends OTA relay commands 208 to power the target ECU 114 via the PDB 202 at 306. In an example, if the target ECU 114 is controlled via the PDB 202, the OTA update application 132 of the body control ECU 112 may be programmed to cause the body control ECU 112 to send OTA relay commands 208 via the control interface of the PDB 202 to switch the relay 204 for the ECU 114 to connect the target ECU 114 to the battery 104.

At operation 308, the body control ECU 112 sends OTA sleep ECU commands 210 to cause unaffected ECUs 114 to sleep. In an example, for the other ECUs 114 of the vehicle 102 that are not controlled via the PDB 202, the OTA update application 132 of the body control ECU 112 may be programmed to cause the body control ECU 112 to send OTA sleep ECU commands 210 over the vehicle bus 110 to the ECUs 114 that remain powered during keyoff to instruct those ECUs 114 to sleep. When the ECUs 114 are in sleep mode, keyoff functionality of the ECUs 114 may be disabled to conserve keyoff battery load.

At 310, the vehicle 102 installs the software update 130. In an example, the telematics control unit 114-D sends the software update 130 to the target ECU 114 via the vehicle bus 110. The target ECU 114 may receive the software update 130, and may install the software update 130 to a storage of the target ECU 114.

At operation 312, the body control ECU 112 sends OTA sleep ECU commands 210 to cause unaffected ECUs 114 to exit sleep. In an example, for the ECUs 114 of the vehicle 102 that are not controlled via the PDB 202, the OTA update application 132 of the body control ECU 112 may be programmed to cause the body control ECU 112 to send OTA sleep ECU commands 210 over the vehicle bus 110 to the ECUs 114 that remain powered during keyoff to instruct those ECUs 114 to exit sleep. When the ECUs 114 exit sleep mode, keyoff functionality of the ECUs 114 that was disabled may be re-enabled to allow for the keyoff functionality to resume.

The body control ECU 112 sends OTA relay commands 208 to remove power from the target ECU 114 via the PDB 202 at 314. In an example, if the target ECU 114 is controlled via the PDB 202, the OTA update application 132 of the body control ECU 112 may be programmed to cause the body control ECU 112 to send OTA relay commands 208 via the control interface of the PDB 202 to switch the relay 204 for the ECU 114 to disconnect the target ECU 114 from the battery 104. After operation 314, the process 300 ends.

Computing devices described herein, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C #, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a power distribution box (PDB) including relays to separately connect or disconnect a vehicle battery to corresponding electronic control units (ECUs) of a vehicle; and
a processor programmed to
instruct the PDB via a control interface to cause one of the relays to power a target ECU and to cause other of the relays to withhold power from other of the ECUs that are operable during keyoff but that are not required to be powered for performance of an install of a software update to the target ECU, thereby removing keyoff load of the other of the ECUs from the vehicle battery,
send a sleep command over a vehicle bus to cause powered ECUs other than the target ECU to sleep, and
install the software update to the target ECU.

2. The system of claim 1, wherein the processor is a body control ECU configured to communicate with the control interface of the PDB.

3. The system of claim 2, wherein the control interface is a dedicated set of wires from the body control ECU to the PDB.

4. The system of claim 2, wherein the control interface is the vehicle bus.

5. The system of claim 1, wherein the processor is further programmed to, responsive to completion of the install of the software update:
send an exit sleep command over the vehicle bus to cause the powered ECUs other than the target ECU to exit sleep, and
instruct the PDB via the control interface to cause the one of the relays to remove power from the target ECU.

6. The system of claim 1, wherein the processor is programmed to power the target ECU responsive to direction from a telematics control unit of the vehicle to initiate a software update during vehicle keyoff.

7. The system of claim 6, wherein the telematics control unit is configured to receive the software update over a communications network from a remote server.

8. The system of claim 1, wherein the one of the relays controls a connection of the target ECU to a positive terminal of the vehicle battery, and the other of the relays control respective connections of the other ECUs to the positive terminal of the vehicle battery.

9. A method comprising:
instructing a relay to power a target electronic control unit (ECU) of a vehicle from a vehicle battery at vehicle keyoff;
instructing other relays to withhold power from other ECUs that are operable during keyoff but that are not required to be powered for installing a software update to the target ECU, thereby removing keyoff load of the other of the ECUs from the vehicle battery;
sending a sleep command over a vehicle bus to cause powered ECUs other than the target ECU and the other ECUs to sleep;
installing a software update to the target ECU;
sending an exit sleep command over the vehicle bus to cause the powered ECUs to exit sleep; and
instructing the relay to remove power from the target ECU.

10. The method of claim 9, further comprising:
instructing the relay to power the target ECU by sending a message to a control interface of a power distribution box (PDB) including a plurality of relays to connect the vehicle battery to corresponding electronic control units (ECUs) of the vehicle; and
instructing other of the plurality of relays to withhold power from the other ECUs.

11. The method of claim 10, further comprising instructing the relay and the other of the plurality of relays by a body controller ECU of the vehicle.

12. The method of claim 11, further comprising sending the sleep command and the exit sleep command from the body controller ECU to the PDB.

13. The method of claim 9, further comprising receiving the software update via a telematics control unit over a communications network from a remote server.

14. The method of claim 9, wherein the relay controls a connection of the target ECU to a positive terminal of the vehicle battery, and the other relays control respective connections of the other ECUs to the positive terminal of the vehicle battery.

15. A non-transitory computer readable medium including instructions that, when executed by a processor of a body control electronic control unit (ECU), cause the body control ECU to:
instruct a relay of a power distribution box (PDB) to power a target electronic control unit (ECU) from a vehicle battery at vehicle keyoff;
instruct other relays to withhold power from other ECUs that are operable during keyoff but that are not required to be powered for installing a software update to the target ECU, thereby removing keyoff load of the other of the ECUs from the vehicle battery;
send a sleep command over a vehicle bus to cause powered ECUs other than the target ECU and the other ECUs to sleep to allow for installation of the software update; and
responsive to completion of the installation of the software update, send an exit sleep command over the vehicle bus to cause the powered ECUs to exit sleep and instruct the relay to remove power from the target ECU.

16. The medium of claim 15, wherein the relay controls a connection of the target ECU to the positive terminal of the vehicle battery, and other relays control respective connections of the other ECUs to the positive terminal of the vehicle battery.

* * * * *